3,483,149
NOVEL COATING COMPOSITION
William M. Gresenz, Paramus, and Edward S. Bendrick, Fair Lawn, N.J., and Bruce R. Weber, Chicago, and William J. Archacki, Oak Lawn, Ill., assignors to Interchemical Corporation, New York, N.Y., a corporation of Ohio
No Drawing. Filed May 19, 1966, Ser. No. 551,219
Int. Cl. C08g 41/04
U.S. Cl. 260—18                    12 Claims

ABSTRACT OF THE DISCLOSURE

Composition containing polyethylene imine and a polyamide derived ethylene diamine and dimerized or trimerized unsaturated vegetable oil fatty acids dissolved in volatile solvent. The polyamide may be further modified by including 4,4-bis-(4-hydroxyphenyl) pentanoic acid as a reactant. The composition may be further modified by including a pigment. The compositions are especially useful as heat seal coatings for polyethylene. Polyalkyl acrylates can be used in place of the polyamide resins.

---

This invention relates to a new composition which gives a tough, flexible and heat sealable coating when used on polyethylene. The invention further relates to coatings and inks for use on polyethylene, the adhesion of which to polyethylene is substantially unaffected by the heat and conditions developed during a heat sealing operation.

Polyethylene is being widely used in the packaging industry particularly for food packaging because it provides a very attractive, transparent or semi-transparent, sturdy wrapper with excellent moisture vapor transmission. One important present and potential use of polyethylene is in bread wrappers. Such food packages are heat sealed; that is the closures and seams of the package are formed by drawing the edges of the bag or pouch formed from the sheet between two heated shoes to provide a continuous impervious heat seal. This heat-sealing technique is almost universally used in high speed packaging operations and is relatively inexpensive in operation. During the heat sealing operation the surface of the polyethylene is heated to a temperature of from 180 to 250° F. The heat sealing is actually accomplished through the fusing of a heat sealable coating on the polyethylene.

One major problem which has hampered the use of polyethylene, even treated polyethylene in heat sealed packages, has been the relatively poor adhesion of heat sealable coatings to polyethylene, particularly on aging, that is after the package has been sitting on the shelf for a period of days or weeks after sealing.

We have now discovered a novel coating composition for polyethylene which gives a heat seal to the polyethylene displaying superior adhesion than the adhesion of any of the existing heat sealable coatings for polyethylene. In addition, the composition is a tough flexible and abrasion resistant outer coating for polyethylene.

Our novel coating composition comprises a solution in a volatile organic solvent of polyethylene imine and a polyamide formed by the condensation of ethylene diamine and either dimerized or trimerized unsaturated vegetable oil fatty acids.

The polyamides include those described in U.S. Patent 2,379,413 and may be produced by the methods described in said patent. Among suitable acid components in the polyamide are dimerized linolenic and octadienics acids. Also polyamides of the type described but with terminal 4,4-bis(4-hydroxyphenyl) pentanoic acid groups provide very good acid components. Polyamides so terminated are prepared by including the 4,4-bis(4-hydroxyphenyl) pentanoic acid within the components which are being condensed.

The proportions of ethylene diamine and the acid component being condensed is about the same as those set forth in U.S. Patent 2,379,413 except that when the polyamide further includes 4,4-bis(4-hydroxyphenyl) pentanoic acid, the proportion of dimerized acid is reduced by one mole and the latter is replaced by two moles of monofunctional 4,4-bis(4-hydroxyphenyl) pentanoic acid. Preferably from .005 to 0.15 part of the polyethylene imine and most preferably .02 to 0.12 part are used for each part of the polyamide. (It should be noted that unless otherwise indicated, all proportions are by weight.)

It is to be noted that adhesion produced by the coating composition of this invention in heat sealed polyethylene is superior to the heat seal formed when the polyethylene is first conditioned with a conditioning coating of polyethylene imine and then coated with a polyamide coating without polyethylene imine.

Best results are obtained if the polyethylene is treated polyethylene. Treated polyethylene may be prepared in any of the conventional methods well known in the art e.g., by the photochemical action of chlorine to cause surface oxidation; acid treatment of the surface; flame treating of the surface; exposure of the surface to the action of ozone; and treatment of the surface with electron beams or gamma rays.

In accordance with another aspect of the present invention, it has been found that white inks or coatings may be made which will still remain very adherent to the polyethylene substrate even when the coated polyethylene has been subjected to the conditions of heat sealing.

Conventionally, inks and coatings which are printed upon polyethylene surfaces to be heat sealed are coated with a heat sealable lacquer. After the wrapper is heat sealed, the seal is then broken prior to use of the contents of the package. It has been found in the past that the white inks tend to pull away from the substrate, sticking to the heat sealed lacquer rather than the substrate, and, thereby, develop a very rough, and discontinuous appearance. When used on polyethylene which is to be sealed with a heat sealable lacquer, the white inks or coatings of this invention adhere to the substrate in a continuous fashion when the seal is subsequently broken. Our novel white coatings or inks comprise an inorganic white pigment such as titanium dioxide dispersed in the above described heat sealable coatings of this invention. The applied white inks or coatings are overcoated with a heat sealable lacquer which may be the heat sealable coating of this invention or any other conventional heat sealable coatings.

Alternatively to the polyamide resins described above, the white inks may contain polyalkylacrylates in which the alkyl group contains from one to eight carbons, e.g., polymers and copolymers of methyl methacrylate, ethyl acrylate, butyl acrylate and ethyl hexyl acrylate.

The following examples will illustrate the practice of this invention:

EXAMPLE 1

A sheet of polyethylene treated on both sides having a thickness of about 1 mil is coated on one surface at 1 lb./1000 sq. ft. with a solution of the following ingredients:

| | Parts by weight |
|---|---|
| Polyamide produced by the condensation of dilinolenic acid and ethylene diamine in accordance with the procedure described in U.S. Patent No. 2,379,413 having a softening point (ASTM E28–51T modified) of 95° C. | 43 |
| Polyethylene imine | 1.25 |
| Isopropyl alcohol | 28.0 |
| Primarily aliphatic hydrocarbon solvent having a boiling range of 200–233° C. and a K.B. value of 36 | 26.5 |

The film is then heat sealed to itself by placing the coated surface in contact with the uncoated surface and passing the surfaces between heated jaws of a conventional heat sealer having a temperature of 200 to 250° F. An excellent heat seal is formed.

When this example is repeated, using the same ingredients, proportions and procedure except the polyethylene imine is eliminated, the resulting heat seal is quite poor.

EXAMPLE 2

A sheet of polyethylene treated on both sides having a thickness of about 1 mil is coated on one surface at 1 lb./1000 sq. ft. with a solution of the following ingredients:

| | Parts by weight |
|---|---|
| The polyamide described in Example 1 except that instead of one of the moles of dilinolenic acid, two moles of 4,4-bis(4-hydroxyphenyl) pentanoic acid are used in the preparation of the polyamide | 35.0 |
| Polyethylene imine | 1.75 |
| Isopropyl alcohol | 31.0 |
| Primarily aliphatic hydrocarbon solvent having a boiling range of 200–233° C. and a K.B. value of 36 | 30.0 |

The film is then heat sealed to itself by the coated surface in contact with the uncoated surface and passing the surfaces between heated jaws of a conventional heat sealer having a temperature of 200 to 250° F. An excellent heat seal is formed.

As in Example 1, without the polyethylene imine, the heat seal is quite poor.

The following are formulations for white inks in accordance with this invention:

EXAMPLE 3

| | Parts by weight |
|---|---|
| TiO$_2$ pigment | 40.0 |
| Polyamide prepared from 4 moles of ethylene diamine, 3 moles of dilinolenic acid and 2 moles 4,4-bis(4-hydroxyphenyl) pentanoic acid | 18.0 |
| Polyethylene imine (as a 50% solution in water) | 2.0 |
| Armid HT, a fatty amide mixture comprising 22% hexadecanamide, 75% octadecanamide and 3% 9-octadecanamide | 0.5 |
| Isopropyl alcohol | 24.5 |
| Aliphatic hydrocarbon solvent having a boiling range of 200–233° C. and a K.B. value of 36 | 26.5 |

EXAMPLE 4

| | Parts by weight |
|---|---|
| TiO$_2$ | 33.0 |
| Copolymer of 50% methyl methacrylate and 50% butyl acrylate | 10.0 |
| Polyethylene imine | 1.0 |
| Cellulose acetate butyrate | 5.0 |
| Ethyl alcohol | 25.0 |
| n-Propyl acetate | 20.6 |

EXAMPLE 5

| | Parts by weight |
|---|---|
| TiO$_2$ pigment | 40.0 |
| Polyamide prepared from 4 moles of ethylene diamine, 3 moles of Empol 1018[1] and 2 moles of 4,4-bis(4-hydroxyphenyl) pentanoic acid | 18.0 |
| Polyethylene imine (as a 50% solution in water) | 2.0 |
| Armid HT, a fatty amide mixture comprising 22% hexadecanamide, 75% octadecanamide and 3% 9-octadecanamide | 0.5 |
| Isopropyl alcohol | 24.5 |
| Aliphatic hydrocarbon solvent having a boiling range of 200–233° C. and a K.B. value of 36 | 26.5 |

[1] Empol 1018 is a mixture of 83% C$_{36}$ dibasic acid (dimer acid) and 17% C$_{54}$ tribasic acid (trimer acid), acid value 188–196, saponification value 192–198, and neutralization equivalent 287–299.

It will be clear that the inks of Examples 3–5 are flexographic inks. It should be apparent to those skilled in the art that when the inks are to be used in gravure or letterpress inks, other solvent combinations may be used.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A coating composition comprising a solution in a volatile solvent of from .005 to 0.15 part by weight of polyethylene imine per part by weight of a polyamide formed by the condensation of ethylene diamine and a member selected from the group consisting of dimerized and trimerized unsaturated vegetable oil fatty acids.

2. The composition of claim 1 wherein said member is dimerized linolenic acid.

3. The composition of claim 1 wherein said member is dimerized octadecadienic acid.

4. The composition of claim 1 wherein said polyamide is formed by the condensation of ethylene diamine, 4,4-bis(4-hydroxyphenyl) pentanoic acid and dimerized unsaturated vegetable oil fatty acids.

5. The composition of claim 4 wherein said dimerized unsaturated vegetable oil fatty acid is dimerized linolenic acid.

6. The composition of claim 4 wherein said dimerized unsaturated vegetable oil fatty acid is dimerized octadecadienic acid.

7. A coating composition comprising an inorganic white pigment dispersed in a solution in a volatile organic solvent of from .005 to 0.15 part by weight of polyethylene imine per part by weight of a resin selected from the group consisting of (A) a polyamide formed by the condensation of ethylene diamine and a member selected from the group consisting of dimerized and trimerized unsaturated vegetable oil fatty acids and (B) a polyalkylacrylate in which the alkyl group has from 1 to 8 carbons.

8. The coating composition of claim 7 wherein said resin is the polyalkylacrylate in which the alkyl group has from 1 to 8 carbons.

9. The coating composition of claim 8 wherein said polyalkylacrylate is a copolymer of methyl methacrylate and butyl methacrylate.

10. The coating composition of claim 8 wherein said polyalkylacrylate is a copolymer of methyl methacrylate and ethyl acrylate.

11. The coating composition of claim 7 wherein said pigment is titanium dioxide.

12. A coating composition comprising a solution in a volatile organic solvent of from .005 to 0.15 part by weight of polyethylene imine per part by weight of a polyalkylacrylate in which the alkyl group has from 1 to 8 carbons.

References Cited

UNITED STATES PATENTS

| | | | |
|---|---|---|---|
| 3,268,461 | 8/1966 | Jacobson et al. | 260—18 |
| 3,230,135 | 1/1966 | Hurst | 161—250 |
| 3,205,156 | 9/1965 | Atarashi | 204—159.17 |
| 2,828,237 | 3/1958 | Rosser | 161—249 |

FOREIGN PATENTS 1,211,228   2/1966   Germany.

OTHER REFERENCES

Chemical Abstracts: vol. 64, col. 3852–3853a, "Coatings for Cellulose Film"; vol. 64, col. 12919e, "Coating Polyolefin Articles To Improve Printability."

DONALD E. CZAJA, Primary Examiner

C. W. IVY, Assistant Examiner

U.S. Cl. X.R.

260—37, 41, 33.4, 33.6, 32.6, 31.2, 857, 901, 2; 117—138.8, 161; 156—331